United States Patent
Chong et al.

(10) Patent No.: US 12,358,537 B2
(45) Date of Patent: Jul. 15, 2025

(54) NAVIGATION WITH DRIVABLE AREA DETECTION

(71) Applicant: Motional AD LLC, Boston, MA (US)

(72) Inventors: Zhuang Jie Chong, Singapore (SG); Ning Wu, Singapore (SG)

(73) Assignee: Motional AD LLC, Boston, MA (US)

( * ) Notice: Subject to any disclaimer, the term of this patent is extended or adjusted under 35 U.S.C. 154(b) by 296 days.

(21) Appl. No.: 18/123,907

(22) Filed: Mar. 20, 2023

(65) Prior Publication Data

US 2023/0311947 A1 Oct. 5, 2023

Related U.S. Application Data

(63) Continuation of application No. 17/459,096, filed on Aug. 27, 2021, now Pat. No. 11,608,084.

(51) Int. Cl.
*B60W 60/00* (2020.01)
*G06V 20/58* (2022.01)

(52) U.S. Cl.
CPC .... *B60W 60/0027* (2020.02); *B60W 60/0013* (2020.02); *G06V 20/58* (2022.01); *B60W 2420/403* (2013.01); *B60W 2520/28* (2013.01); *B60W 2554/4026* (2020.02); *B60W 2554/4029* (2020.02); *B60W 2554/801* (2020.02); *B60W 2554/802* (2020.02); *B60W 2554/803* (2020.02); *B60W 2554/804* (2020.02); *B60W 2556/45* (2020.02)

(58) Field of Classification Search
None
See application file for complete search history.

(56) References Cited

U.S. PATENT DOCUMENTS

| | | |
|---|---|---|
| 10,007,269 B1 | 6/2018 | Gray |
| 10,620,317 B1 | 4/2020 | Chai et al. |
| 10,928,830 B1 | 2/2021 | Tran |
| 11,385,656 B2 | 7/2022 | Garcia et al. |

(Continued)

FOREIGN PATENT DOCUMENTS

| | | |
|---|---|---|
| GB | 2570887 | 8/2019 |
| JP | 2019199185 | 11/2019 |

(Continued)

OTHER PUBLICATIONS

[No Author Listed], "Sae: Surface Vehicle Recommended Practice, Taxonomy and Definitions for Terms Related to Driving Automation Systems for On-Road Motor Vehicles," SAE International, Sep. 30, 2016, 30 pages.

(Continued)

*Primary Examiner* — David P. Merlino
(74) *Attorney, Agent, or Firm* — Fish & Richardson P.C.

(57) ABSTRACT

Enclosed are embodiments for navigation with drivable area detection. In an embodiment, a method comprises: receiving a point cloud from a depth sensor, receiving image data from a camera; predicting at least one label indicating a drivable area by applying machine learning to the image data; labeling the point cloud using the at least one label; obtaining odometry information; generating a drivable area by registering the labeled point cloud and odometry information to a reference coordinate system; and controlling the vehicle to drive within the drivable area.

20 Claims, 11 Drawing Sheets

(56) References Cited

U.S. PATENT DOCUMENTS

| | | |
|---|---|---|
| 11,608,084 B1 | 3/2023 | Chong et al. |
| 2018/0089563 A1 | 3/2018 | Redding et al. |
| 2018/0224863 A1 | 8/2018 | Fu |
| 2018/0225515 A1 | 8/2018 | Jiang et al. |
| 2019/0056748 A1 | 2/2019 | Budihal et al. |
| 2019/0163989 A1 | 5/2019 | Guo et al. |
| 2019/0163990 A1 | 5/2019 | Mei et al. |
| 2019/0286915 A1 | 9/2019 | Patil |
| 2020/0159225 A1 | 5/2020 | Zeng et al. |
| 2020/0257901 A1 | 8/2020 | Walls et al. |
| 2020/0285244 A1 | 9/2020 | Gier et al. |
| 2020/0293058 A1 | 9/2020 | Fu |
| 2020/0377233 A1 | 12/2020 | Harvey et al. |
| 2021/0004021 A1 | 1/2021 | Zhang et al. |
| 2021/0019536 A1 | 1/2021 | Motoyama |
| 2021/0043002 A1 | 2/2021 | Zeng |
| 2021/0078592 A1 | 3/2021 | Febbo et al. |
| 2021/0199446 A1 | 7/2021 | Marschner et al. |
| 2021/0232851 A1 | 7/2021 | Redford et al. |
| 2021/0291862 A1 | 9/2021 | Jiang et al. |
| 2021/0294340 A1* | 9/2021 | Zhou ............... G05D 1/0221 |
| 2021/0323573 A1 | 10/2021 | Gogna |
| 2021/0327277 A1* | 10/2021 | Sakaguchi ......... B60W 60/0011 |
| 2022/0001895 A1 | 1/2022 | Inaba et al. |
| 2022/0161853 A1 | 5/2022 | Ramirez Llanos et al. |
| 2023/0069215 A1 | 3/2023 | Chong et al. |

FOREIGN PATENT DOCUMENTS

| | | |
|---|---|---|
| JP | 2021009655 | 1/2021 |
| JP | 2021046193 | 3/2021 |
| KR | 10-2017-0104287 | 9/2017 |
| KR | 10-2019-0001668 | 1/2019 |
| KR | 10-2020-0125910 | 11/2020 |
| KR | 10-2021-0082204 | 7/2021 |
| WO | WO 2008/099915 | 8/2008 |

OTHER PUBLICATIONS

Li et al., "Building and optimization of 3D semantic map based on Lidar and camera fusion," Neurocomputing, 2020, 409:394-407.

Liu et al., "Single shot multibox detector," European Conference on Computer Vision, Oct. 8, 2016, 21-37.

* cited by examiner

NAVIGATION WITH DRIVABLE AREA DETECTION

CROSS-REFERENCE TO RELATED APPLICATION

This application is a continuation of and claims priority to U.S. patent application Ser. No. 17/459,096, filed Aug. 27, 2021, the entire contents of which are incorporated herein by reference.

FIELD OF THE INVENTION

The description that follows relates to autonomous vehicle systems.

BACKGROUND

Autonomous vehicles include multiple sensors (e.g., cameras, RADAR, LiDAR) that are used to gather data about the operating environment of the vehicle. The data is used by the vehicle to predict the states of agents in the operating environment and to plan and execute a trajectory for the vehicle in the operating environment that accounts for various rules and constraints, such as map constraints (e.g., drivable area), safety constraints (e.g., avoid colliding with other objects) and passenger comfort constraints (e.g., minimize sharp turns, hard braking and fast accelerations/decelerations).

The planning and execution of a vehicle trajectory includes estimating a geographic location of the vehicle in a reference coordinate system. Determining a vehicle's precise position on a map is called "localization." When a vehicle is localized its positional relationship to other objects or structures on the map and agents operating in the environment can be determined. Various subsystems of an autonomous vehicle technology stack, such as a motion planner, will base its decisions on the localization information.

Existing approaches use a singular positioning system, such as map-based localization, where the current position and velocity of the vehicle is feed into the technology stack. These approaches create a potential single point of failure for safety critical subsystems.

SUMMARY

Techniques are provided for navigation with drivable area detection.

In an embodiment, a method comprises: receiving, with at least one processor, a point cloud from a depth sensor; receiving, with the at least one processor, image data from a camera; predicting, with the at least one processor, at least one label indicating a drivable area by applying machine learning to the image data; labeling, with the at least one processor, the point cloud using the at least one label; obtaining, with the at least one processor, odometry information; generating, with the at least one processor, a drivable area by registering the labeled point cloud and odometry information to a reference coordinate system; and controlling, with the at least one processor, the vehicle to drive within the drivable area.

In an embodiment, the machine learning comprises pixel-based image segmentation.

In an embodiment, labeling the point cloud comprises projecting points in the point cloud onto the image data using pinhole projection.

In an embodiment, the odometry information is obtained from motion data provided by at least one inertial sensor and wheel speed provided by a wheel speed sensor.

In an embodiment, controlling the vehicle to drive within the drivable area comprises: generating, with a first vehicle control model, a first trajectory for the vehicle based on a first spatial constraint and a velocity constraint; generating, with a second vehicle control model, a second trajectory for the vehicle based on a second spatial constraint, where the second spatial constraint is the drivable area; and selecting, by a vehicle controller, one of the first trajectory or the second trajectory for the vehicle within the drivable area.

In an embodiment, the first spatial constraint and velocity constraint are generated based on a maneuver definition generated based on a planned route, map data and perception data.

In an embodiment, the perception data includes at least one object detection.

In an embodiment, at least one of the first control model and the second control model is a motion predictive control (MPC) model.

In an embodiment, the second trajectory is generated by minimizing a cost function of tracking and comfort constraints.

In an embodiment, the second vehicle control model is a kinematic bicycle model.

In an embodiment, a first label of the at least one label is a predicted drivable area and a second label of the at least one label is at least one object.

In an embodiment, the at least one object is another vehicle or a pedestrian.

One or more of the disclosed embodiments provide one or more of the following advantages. A trajectory proposal for an autonomous vehicle is generated in real-time using free space information from a detected drivable area. The detected drivable area is generated using sensor information provided by, for example, one or more cameras and/or LiDAR. The trajectory proposal is map-independent, and therefore can be used as an alternative control path for the vehicle when a failure occurs in a subsystem of the technology stack, such as failures of localization, perception or planning subsystems.

The discloses embodiments provide a redundant system that provides an alternative drive by wire (DBW) control path to improve safety, utilizes machine learning classification, provides an alternative approach to existing localization, perception, planning and control pipelines and add minimal additional computation requirements to existing subsystems.

Some examples of applications that could benefit from the disclosed embodiments include but are not limited to: low speed navigation in parking lots or pick up/drop off zones and navigating challenging environments, such as narrow spaces, construction zones, unpaved roads and/or the like.

These and other aspects, features, and implementations can be expressed as methods, apparatus, systems, components, program products, means or steps for performing a function, and in other ways. These and other aspects, features, and implementations will become apparent from the following descriptions, including the claims.

DETAILED DESCRIPTION

Figure 1:
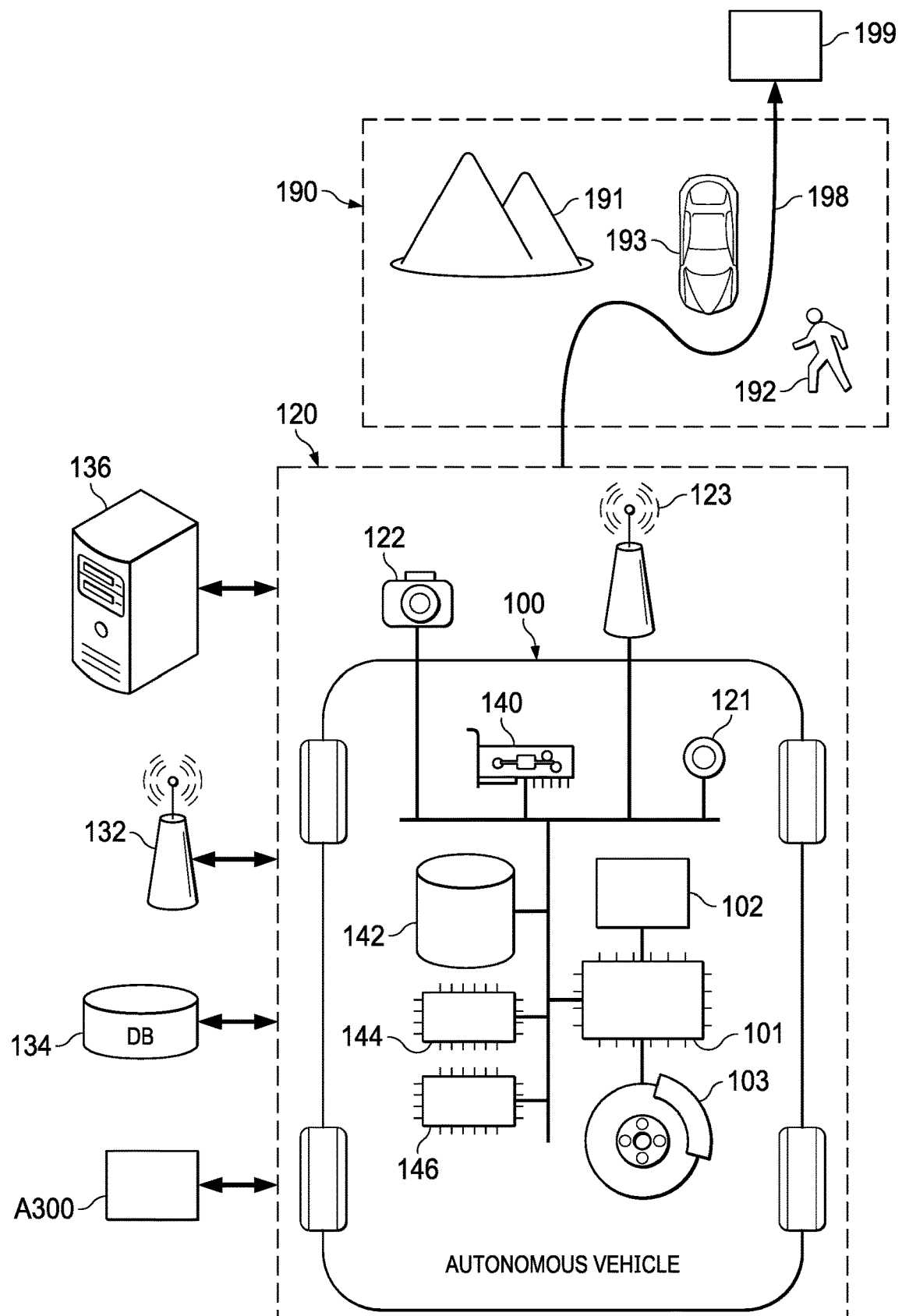
FIG. 1 shows an example of an autonomous vehicle (AV) having autonomous capability, in accordance with one or more embodiments.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, subsystems, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
   2. System Overview
   3. Autonomous Vehicle Architecture
   4. Navigation With Drivable Area Detection General Overview Techniques are provided for navigation with drivable area detection.

In an embodiment, labeled point cloud data from at least one camera sensor and three-dimensional (3D) sensor (e.g., a LiDAR point cloud) is generated using pixel-based segmentation on the camera image using a machine learning model. In an embodiment, the machine learning model is an image segmentation network (ISN), which takes the camera image as input and outputs a pixel-wise drivable area mask with at least one label per pixel showing drivable area. In an embodiment, at least one label per pixel is output by the ISN for at least one object captured in the point cloud (e.g., another vehicle). Each LiDAR point is projected (e.g., using pinhole projection) onto the camera image and the at least one label is applied to the corresponding point on the image. For example, pixels in the camera image that are part of the drivable area are labeled as drivable are and pixels outside the drivable area are labeled as non-drivable area. In an embodiment, the ISN is implemented using a deep convolutional neural network.

Because a single point cloud may contain only sparse data that is not sufficient to enable data query for robust on road navigation, in an embodiment odometry information is used to generate dense information for drivable areas by performing point cloud registration using the vehicle's motion state. For example, acceleration and angular rate data from an inertial measurement unit (IMU) and wheel speed from a wheel speed sensor can be used by an odometry subsystem to generate position information that can be used for point cloud registration to determine a drivable area that be queried in real-time by various subsystems of the stack (e.g., perception system, planning subsystem, control subsystem).

System Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, motorcycles, bicycles, etc. A driverless car is an example of a vehicle.

As used herein, "trajectory" refers to a path or route to operate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "realization" refers to a trajectory generated by the sample-based maneuver realizer, described herein.

A "maneuver" is a change in position, speed or steering angle (heading) of an AV. Al maneuvers are trajectories but not all trajectories are maneuvers. E.g., an AV trajectory where the AV is traveling in a straight path at a constant speed is not a maneuver.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings or having two lanes between the lane markings. A lane could also be interpreted in the absence of lane markings. For example, a lane may be defined based on physical features of an environment, e.g., rocks and trees along a thoroughfare in a rural area.

As used herein, a "rulebook" is a data structure implementing a priority structure on a set of rules that are arranged based on their relative importance, where for any particular rule in the priority structure, the rule(s) having lower priority in the structure than the particular rule in the priority structure have lower importance than the particular rule. Possible priority structures include but are not limited to: hierarchical structures (e.g., total order or partial-order on the rules), non-hierarchical structures (e.g., a weighting system on the rules) or a hybrid priority structure in which subsets of rules are hierarchical but rules within each subset are non-hierarchical. Rules can include traffic laws, safety rules, ethical rules, local culture rules, passenger comfort rules and any other rules that could be used to evaluate a trajectory of a vehicle provided by any source (e.g., humans, text, regulations, websites).

As used herein, "ego vehicle" or "ego" refers to a virtual vehicle or AV with virtual sensors for sensing a virtual environment that is utilized by, for example, a planner to plan the route of the virtual AV in the virtual environment.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "includes," and/or "including," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV.

In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear velocity and acceleration, angular velocity and acceleration, and heading (e.g., an orientation of the leading end of AV 100). Example of sensors 121 are a Global Navigation Satellite System (GNSS) receiver, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Example Cloud Computing Environment

Figure 2:
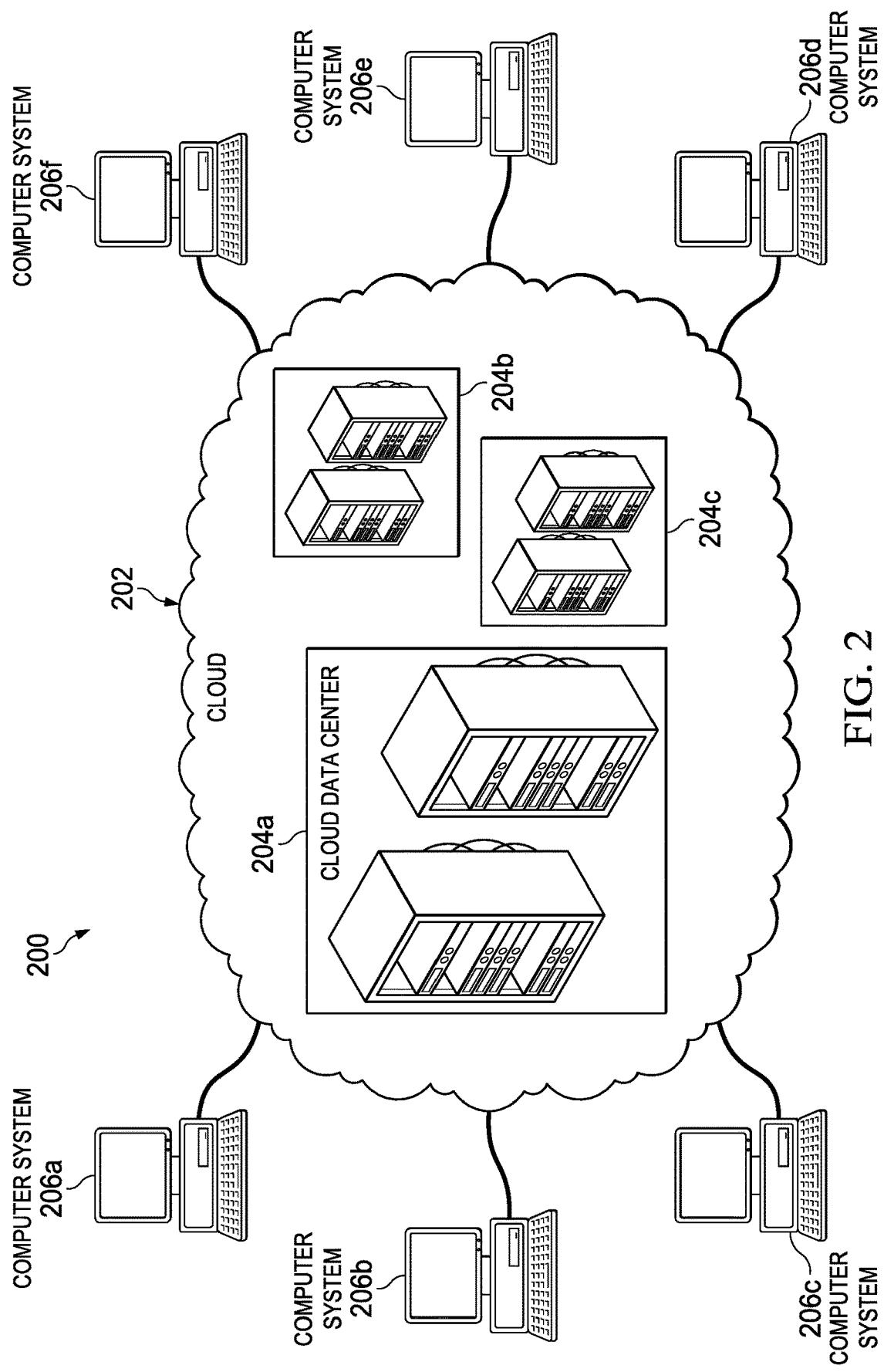
FIG. 2 illustrates an example "cloud" computing environment, in accordance with one or more embodiments.

FIG. 2 illustrates an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Computer System

Figure 3:
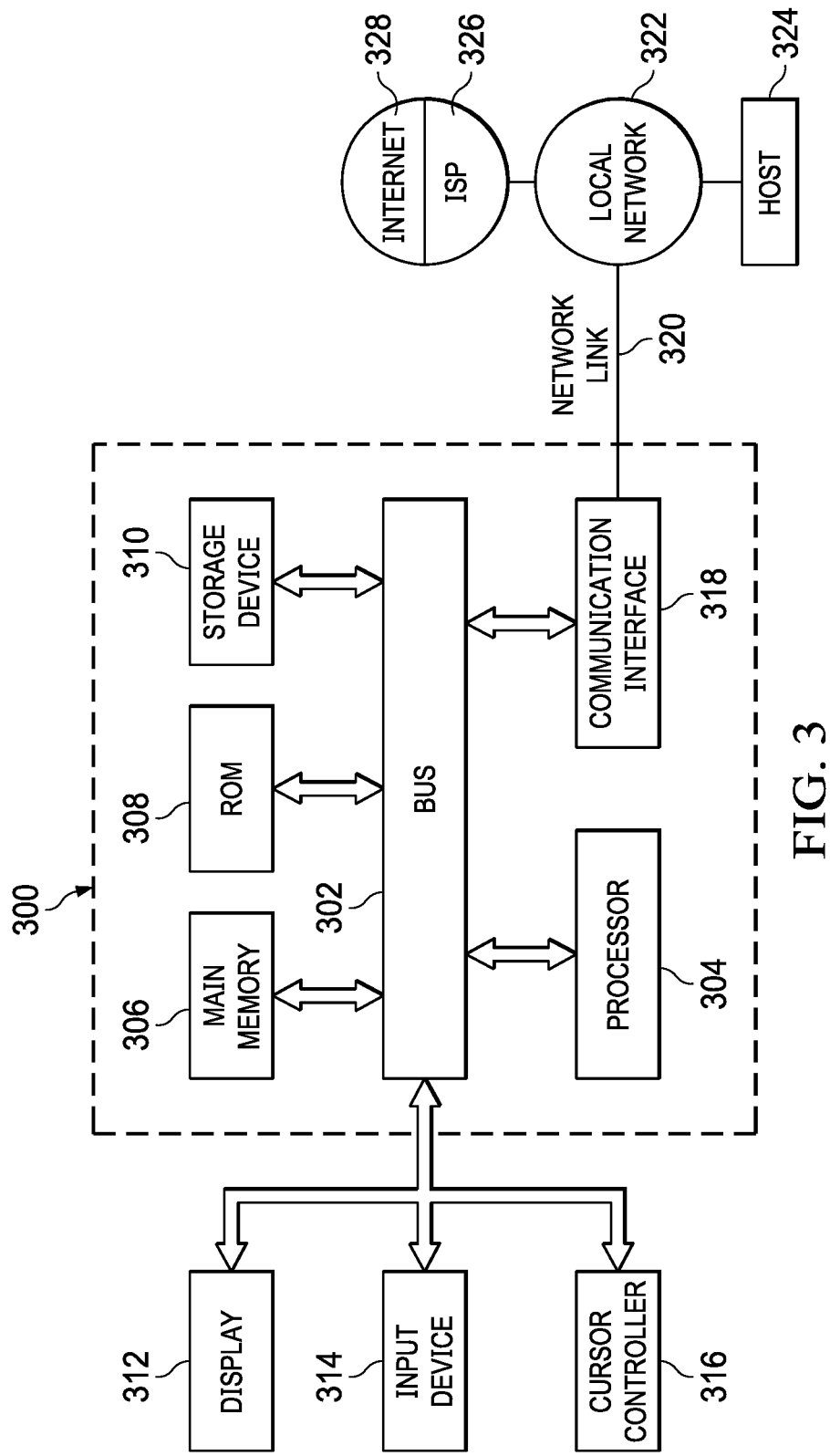
FIG. 3 illustrates a computer system, in accordance with one or more embodiments.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that include the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic, or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
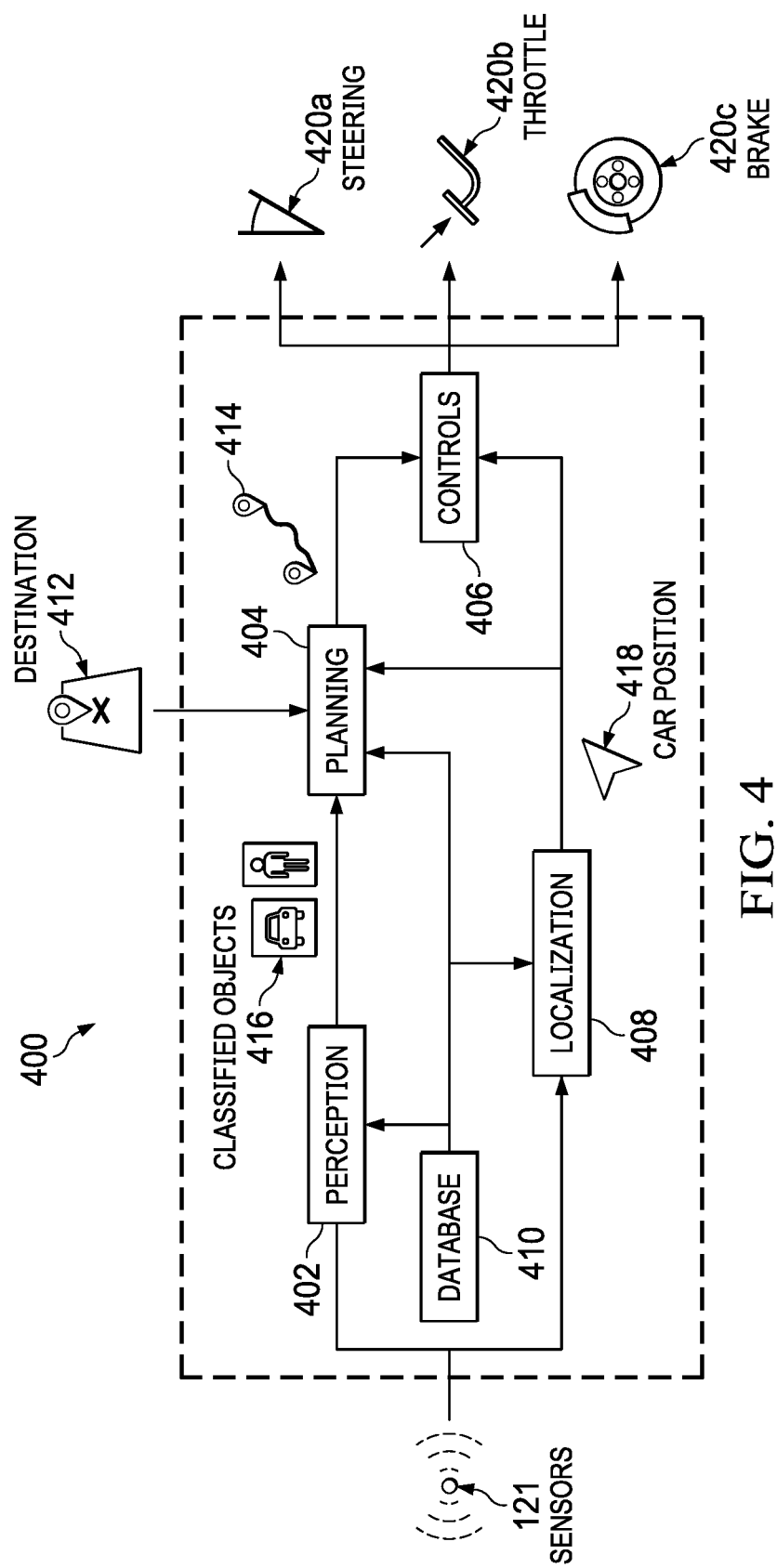
FIG. 4 illustrates an example architecture for an AV, in accordance with one or more embodiments.

FIG. 4 shows an example architecture 400 for an autonomous vehicle (e.g., the AV 100 shown in FIG. 1). The architecture 400 includes a perception subsystem 402 (sometimes referred to as a perception circuit), a planning subsystem 404 (sometimes referred to as a planning circuit), a control subsystem 406 (sometimes referred to as a control circuit), a localization subsystem 408 (sometimes referred to as a localization circuit), and a database subsystem 410 (sometimes referred to as a database circuit). Each subsystem plays a role in the operation of the AV 100. Together, the subsystems 402, 404, 406, 408, and 410 may be part of the AV system 120 shown in FIG. 1. In some embodiments, any of the subsystems 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning subsystem 404 receives data representing a destination 412 and determines data representing a trajectory 414 (sometimes referred to as a route) that can be traveled by the AV 100 to reach (e.g., arrive at) the destination 412. In order for the planning subsystem 404 to determine the data representing the trajectory 414, the planning subsystem 404 receives data from the perception subsystem 402, the localization subsystem 408, and the database sub system 410.

The perception subsystem 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning subsystem 404.

The planning subsystem 404 also receives data representing the AV position 418 from the localization subsystem 408. The localization subsystem 408 determines the AV position by using data from the sensors 121 and data from the database subsystem 410 (e.g., a geographic data) to calculate a position. For example, the localization subsystem 408 uses data from a GNSS receiver and geographic data to calculate a longitude and latitude of the AV. In an embodiment, data used by the localization subsystem 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types.

The control subsystem 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control subsystem 406 will operate the control functions 420a-c in a manner such that the steering angle of the steering function will cause the AV 100 to turn left and the throttling and braking will cause the AV 100 to pause and wait for passing pedestrians or vehicles before the turn is made.

Navigation Using Drivable Area Detection

Figure 5:
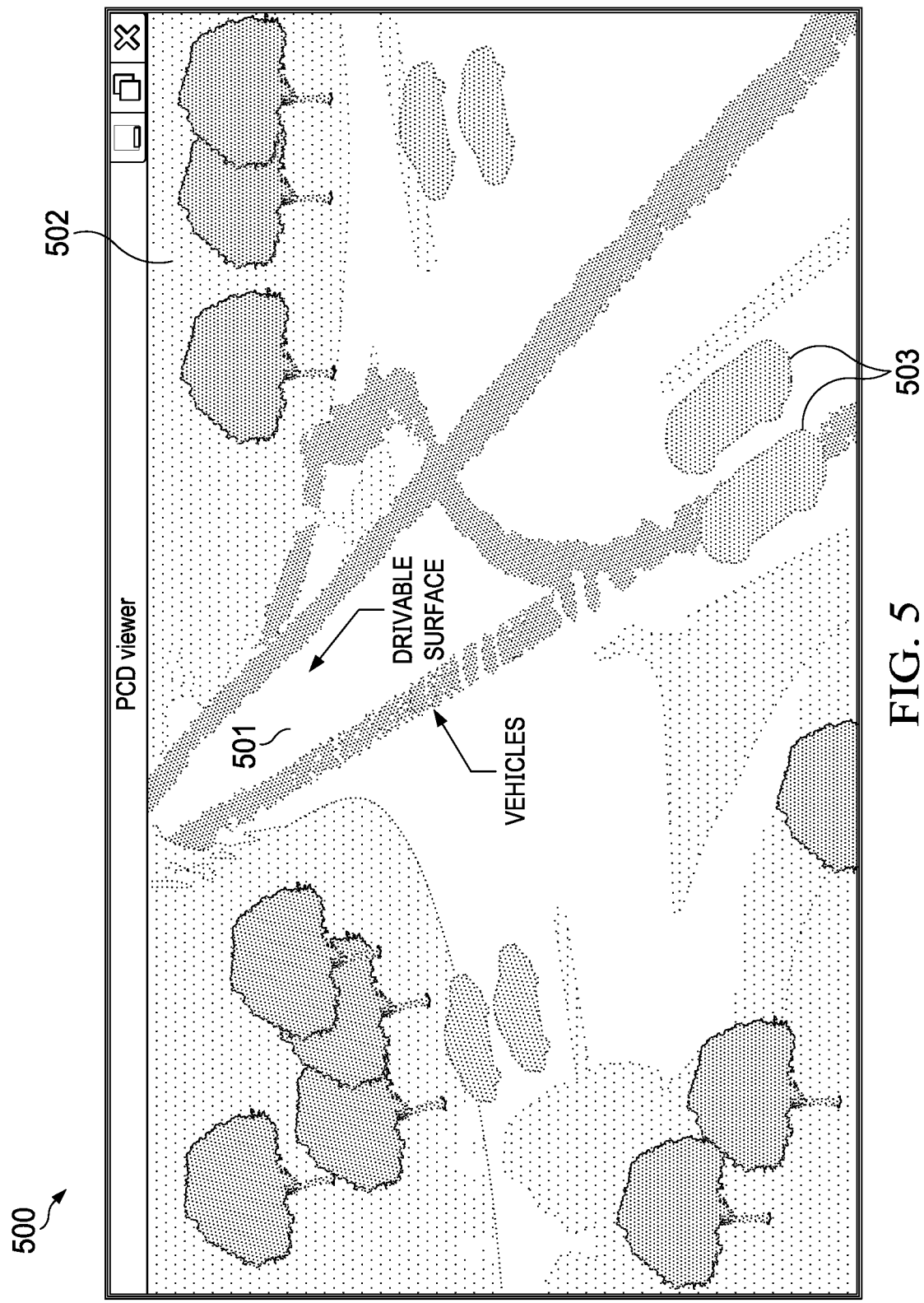
FIG. 5 illustrates example point cloud data accumulated in real-time showing a drivable area, in accordance with one or more embodiments.

FIG. 5 illustrates example point cloud data accumulated in real-time showing a drivable area 500, in accordance with one or more embodiments. Also shown are a number of vehicles 501a ... 501f. As will be described below, the drivable area 500 can be used as an alternative trajectory proposal for various subsystems of an AV technology stack, such as planning, perception and control subsystems. Since the drivable area 500 is generated in real-time, the alternative trajectory proposal can be used as an alternative control path to navigate the vehicle in the event the primary map-based localization subsystem fails, as described in reference to FIG. 8.

Figure 6:
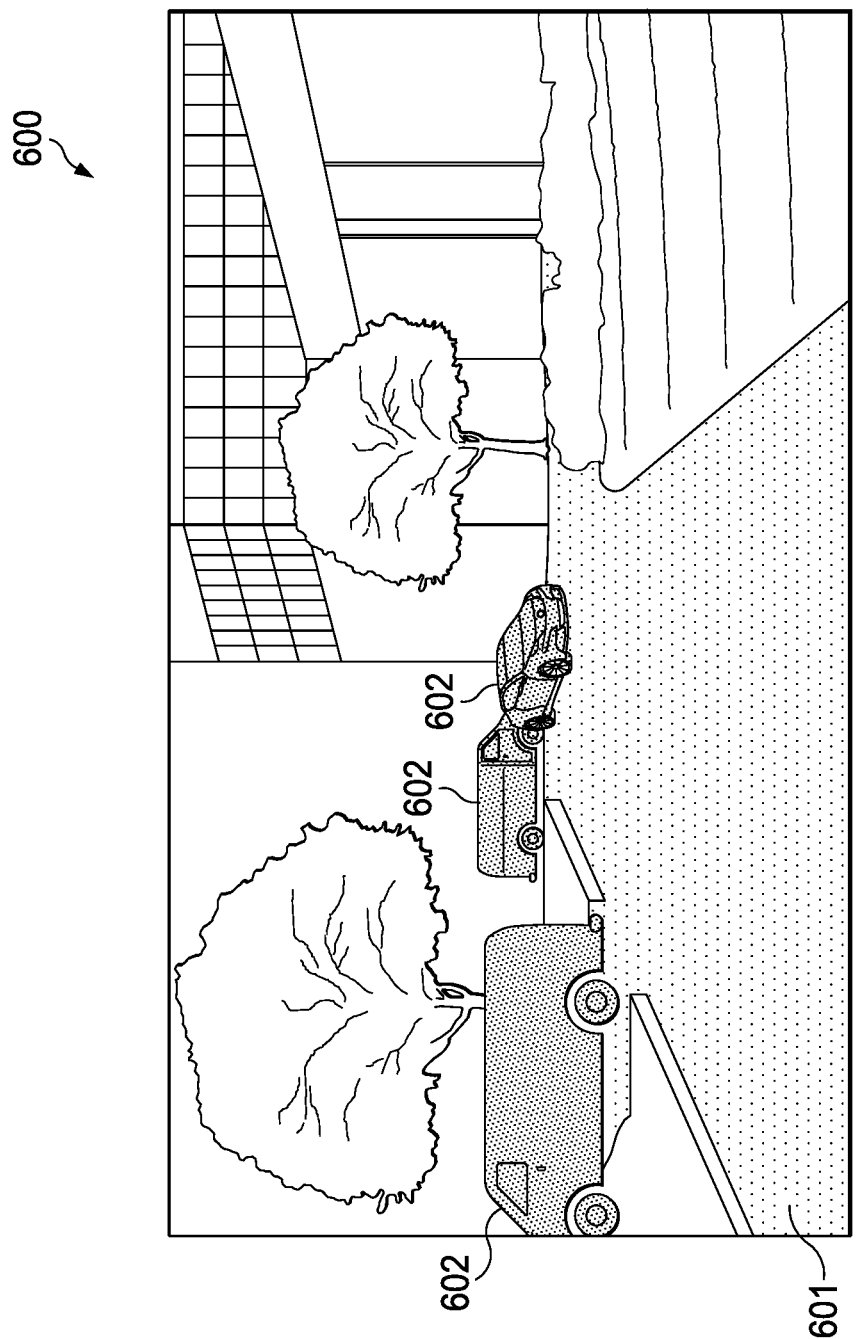
FIG. 6 illustrates point cloud data projected into a camera image showing a labeled drivable area and labeled vehicles, in accordance with one or more embodiments.

FIG. 6 illustrates point cloud data projected into a camera image showing a labeled drivable area and labeled vehicles, in accordance with one or more embodiments. In an embodiment, at least one LiDAR and at least one camera can be used to generate labeled point cloud data using, for example, pixel-based segmentation performed on the camera image using an ISN, where each pixel has an associated label. An example ISN is described in reference to FIG. 9.

The example output of the ISN shown includes two labels: drivable area 601 and vehicles 602a ... 602c. LiDAR points are projected onto the labeled image using, for example, a pinhole projection and each point is associated with at least one label. For example, if a projected point falls on a pixel in the image labeled drivable area then that point will also be associated with the label "drivable area."

In an embodiment, a pinhole projection for each LiDAR return point $p_L$ and for each vision pipeline CAM (i.e., for each camera in a multicamera system) is as follows:

$$\text{coords} = \pi(CAM, T_L, D, p_L), \quad [1]$$

where $\pi$ represents the pinhole projection (multiply each point by a camera matrix and divide by the z coordinate), $T_L$ is the pose of the LiDAR in the specific camera frame (based on a calibration file), D is the relative dead-reckoning of the measurements (to assist in synchronization of camera and LiDAR data), $p_L$ is the LiDAR return point and coords represents the row and column coordinate of the image from where the label is selected.

In some cases, the same LiDAR point may be projected on more than one vision pipeline (e.g., overlapping camera FOVs). The segmented images of the vision pipeline output by ISN provides 4 values for each pixel ($1^{st}$ label, confidence of $1^{st}$ label, $2^{nd}$ label, confidence of $2^{nd}$ label). In case a LiDAR labeled point is projected to another segmented image, the confidence values are compared and the label with the highest confidence value (the most probable) is selected as the label for the point.

If the LiDAR point cloud is organized as a matrix (via spherical or cylindrical projection), the label processing speed can be increased using a camera field of view (FOV) optimization. For example, a set of LiDAR columns in each camera FOV are selected. For each camera, an imaginary point with depth=100 m passing through the first and last column of the camera image is un-projected. The points in the LiDAR frame are then transformed and an azimuth value is computed for each pair of points for each camera. The azimuth values are then converted to columns in an organized spherical projection. After this processing is complete, there is a reduced set of points in each camera FOV, thus saving computational time by reducing the number of pinhole projections. In an embodiment, at least one geometric check on the projected points detect outlier points. For example, if a vehicle-labeled point is on the ground then it can be excluded from further processing.

Figure 7:
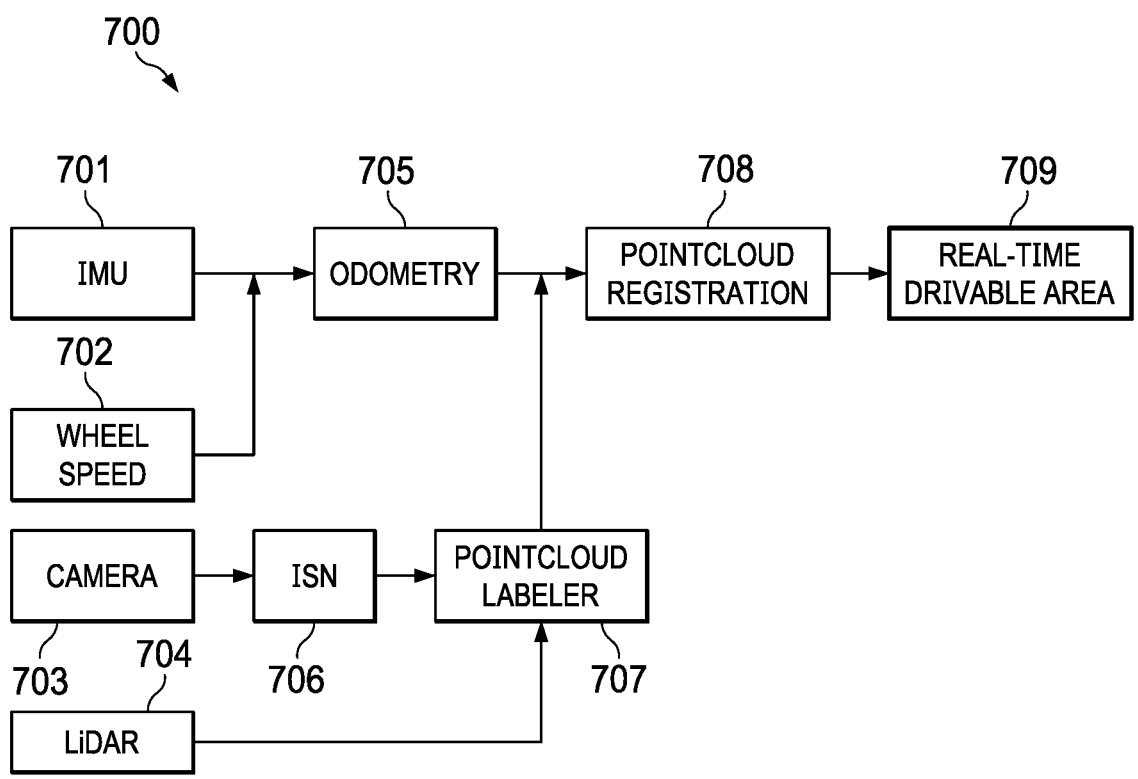
FIG. 7 is block diagram of navigation system that uses drivable area detection to generate trajectory proposals, in accordance with one or more embodiments.

FIG. 7 is block diagram of navigation system 700 that uses drivable area detection to generate trajectory proposals, in accordance with one or more embodiments. System 700 includes IMU 701, wheel speed sensors 702, camera 702, LiDAR 704, odometry subsystem 705, ISN 706, point cloud labeler 707, point cloud registration 708 and real-time drivable area 709.

IMU 701 includes accelerometers and angular rate sensors (e.g., gyro sensors) for measuring the acceleration and orientation of the vehicle (e.g., yaw angle) in an inertial coordinate system. The speed of each wheel is measured using wheel speed sensors 702 (e.g., a rotary encoders). The orientation and wheel speeds are input into odometry subsystem 705, which computes the position and heading of the vehicle in global coordinates. For example, in an embodiment odometry subsystem 705 computes the position X of the vehicle as follows:

$$X_t = f(x, y, \theta, \Delta s_r, \Delta s_l) = \begin{bmatrix} x \\ y \\ \theta \end{bmatrix} \begin{bmatrix} \frac{\Delta s_r + \Delta s_l}{2} \cos\left(\theta + \frac{\Delta s_r - \Delta s_l}{4L}\right) \\ \frac{\Delta s_r + \Delta s_l}{2} \sin\left(\theta + \frac{\Delta s_r - \Delta s_l}{4L}\right) \\ \frac{\Delta s_r - \Delta s_l}{2L} \end{bmatrix}, \quad [2]$$

where $\Delta s_l$ is the distance the left wheel traveled in time t, $\Delta s_r$ is the distance the right wheel traveled in time t, $\theta$ is the yaw angle at time t and L is one half the distance between the left and right wheels. Note that Equation [2] does not model uncertainty in motion due to sensor error, drag force, etc. Those with ordinary skill in the art would understand how to model such error.

The odometry position Xt of the vehicle and a labeled LiDAR point cloud is input into point cloud registration 708. Point cloud registration 708 merges the odometry position Xt and labeled point cloud data in global coordinates, and outputs a real-time drivable area where the odometry data adds additional position information to areas with sparse point cloud data.

In a separate processing path, camera 702 captures images and inputs the images into ISN 706. ISN 706 outputs an image where each pixel is labeled as drivable area, non-drivable area or a detected object (e.g., another vehicle, pedestrian, bicyclist, etc.). The labeled image is input into point cloud labeler 707 together with the point cloud generated by LiDAR 704. Point cloud labeler 707 projects the points onto the camera image and associates each point with a corresponding pixel label. The labeled point cloud is then input into point cloud registration 708 where it is merged with the odometry vehicle locations in global coordinates.

Figure 8:
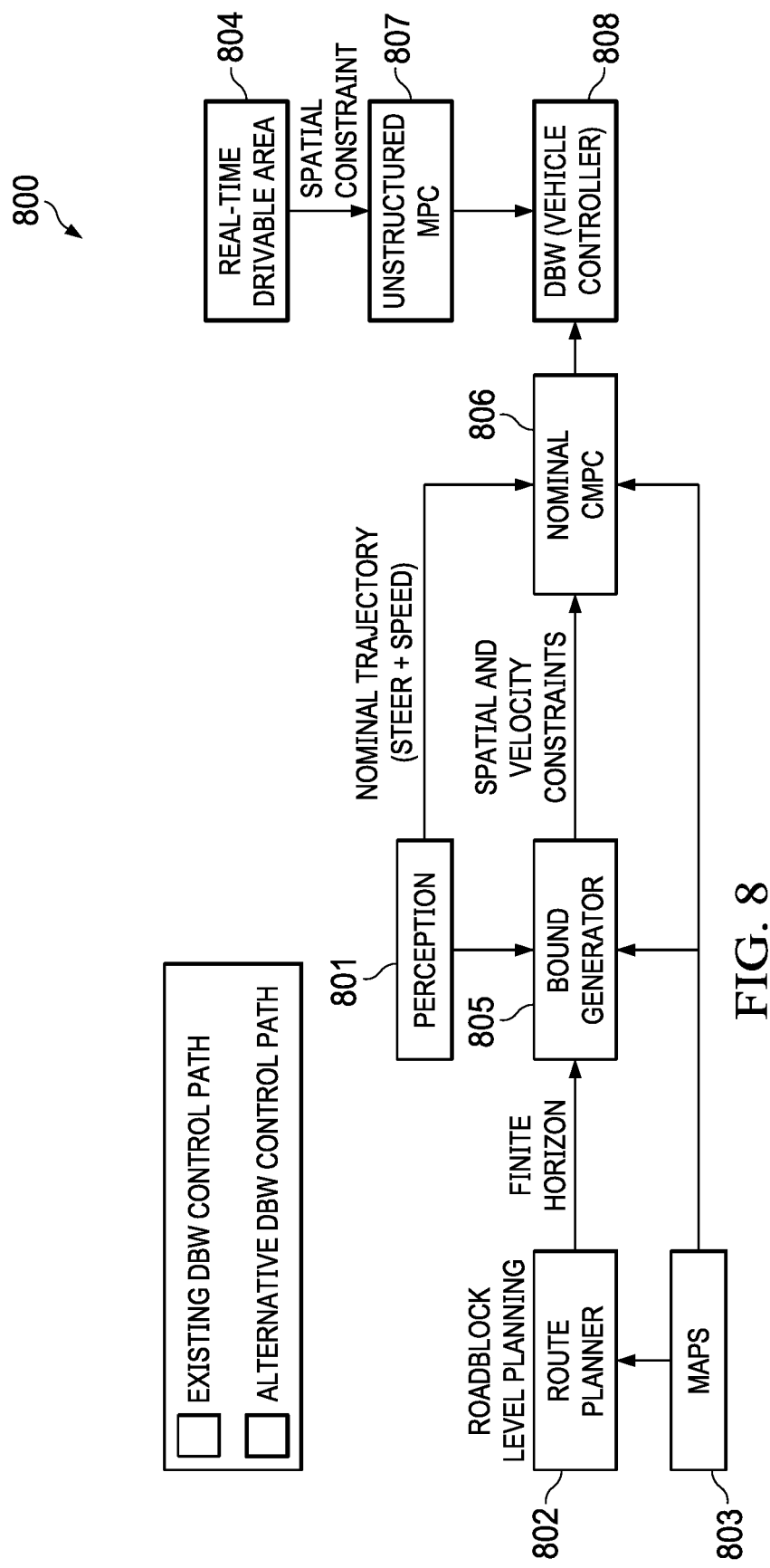
FIG. 8 is a block diagram of an autonomous vehicle system/stack including an alternative control path that used drivable area detection, in accordance with one or more embodiments.

FIG. 8 is a block diagram of an autonomous vehicle system/stack including an alternative control path that used drivable area detection, in accordance with one or more embodiments. In the example shown, navigation system 700 is integrated with Model Predictive Control (MPC). The real-time drivable area is used to query and inform free space to generate unstructured MPC constraints directly. This integration allows for direct calculation of free space within sensor coverage to derive a maximum speed constraint, and allows a vehicle to travel at slow speed on the detected drivable area rather than being "stuck" on the roadway. In an embodiment, the integration with MPC can serve as an alternative drive by wire (DBW) control path that performs navigation directly using the detected drivable area.

In a first control path, route planner 802: 1) receives an initial and terminal state for the vehicle; 2) plans a desired sequence of geometric blocks of road data ("roadblocks") forming lanes with a lane router; 3) divides the route into road segments based on a lane change, such that a segment does not contain a lane change; 4) selects road segments in which the vehicle is located based on the vehicle's physical state (obtained from dynamic world model 508) which is projected on the roadblocks; 5) extracts anchor paths for selected road segments (which can be marked as anchor "desired" in case a lane change is desired); and 6) trims anchor paths based on maximal/minimal length. In case there is no lane change required, the adjacent anchor path is extracted and labeled only as "optional," meaning the vehicle can use the lane if needed for collision avoidance.

The route is input to bound generator 805 together with perception data (e.g., object detections). Bound generator 805 generates spatial and velocity constraints for the vehicle based on the route and perception data. Nominal MPC model 806 generates a nominal trajectory (e.g., steering angle, speed) for the vehicle based on the spatial and velocity constraints, map data and perception data. The nominal trajectory is input into vehicle controller 808 used to control the vehicle in accordance with the spatial and velocity constraints to avoid collisions with other vehicles, pedestrians, bicyclists or any other object or structure in the environment.

In a second control path, the output of system 700 is used as a spatial constraint input into unstructured MPC model 807. The output of unstructured MPC model 807 is a trajectory that follows the drivable area below a maximum speed. The trajectory is input into vehicle controller 808.

In an embodiment, given a motion model, spatial and velocity constraints and a cost function, a trajectory optimization problem is solved by nominal MPC model 806 as follows:

$$x^*_{1:N}, u^*_{1:N-1}, \lambda^*_{1:N} = \underset{x_{1:N}, u_{1:N-1}, \lambda_{1:N}}{\operatorname{argmin}} \sum_{k=0}^{N-1} J_{stage}(x_k, u_k, \lambda_k) + J_{terminal}(x_N, \lambda_N), \quad [2]$$

$$x_{k+1} = f(x_k, u_k),$$
$$c_k(x_k, \lambda_k) \leq 0,$$
$$x \in X,$$
$$u \in U,$$
$$\lambda \in \Lambda.$$

The optimization problem is formulated in state space defined in a curvilinear coordinate frame, where the states are defined with respect to a center of gravity (CoG) of the vehicle. Vehicle controller 808 can query the exact desired position of the vehicle, $x_t = [s, n, \mu, v, a, \delta, \dot{\delta}]$ at any time $t_i$, where s progress, n is lateral error, μ is local heading ($\mu = \psi(\text{yaw}) - \phi_s(\text{pitch})$), v is velocity, a is acceleration in the projected driving direction, δ is the steering angle, $\dot{\delta}$ is the steering rate, u is a vector of input variables including jerk and steering rate, $$u = \begin{bmatrix} u_{jerk} \\ u_{\delta} \end{bmatrix}, \lambda_{hard} = \begin{bmatrix} \lambda_n \\ \lambda_a \\ \lambda_s \end{bmatrix} \text{ and } \lambda_{soft} = \begin{bmatrix} \lambda_{n,soft} \\ \lambda_{v,soft} \\ \lambda_{a,soft} \end{bmatrix}$$

are slack variables, where $\lambda_n$ is slack on a lateral tube containing the trajectory, $\lambda_a$ is the slack on acceleration, $\lambda_s$ is the slack on progress, $\lambda_{n,soft}$ is slack on the soft lateral tube, $\lambda_{v,soft}$ is slack on soft velocity, $\lambda_{a,soft}$ is slack on soft acceleration, and $J_{stage}(\ )$ and $J_{terminal}(\ )$ are cost functions. Equation [2] can be solved using any suitable solver. Other embodiments can use different trajectory optimization methods, including but not limited to learning-based methods or methods that use control barrier functions.

In an embodiment, the motion model is a kinematic bicycle model that allows the side slip angle β of the vehicle to be defined geometrically, so that the velocity ($v_x$, $v_y$) of the vehicle and yaw rate ψ of the vehicle can be expressed in terms of β, as shown in Equation [3]:

$$\dot{x} = \begin{bmatrix} \dot{s} \\ \dot{n} \\ \dot{\mu} \\ \dot{v} \\ \dot{a} \\ \dot{\delta} \\ \ddot{\delta} \end{bmatrix} = \begin{bmatrix} \dfrac{v\cos(\mu + \beta)}{1 - n\kappa} \\ v\sin(\mu + \beta) \\ \dfrac{v}{l_r}\sin(\beta) - \kappa \dfrac{v\cos(\mu + \beta)}{1 - n\kappa} \\ a \\ u_{jerk} \\ \dot{\delta} \\ u_{\delta} \end{bmatrix}, \quad [3]$$

where $$\beta = \arctan\left(\frac{l_r}{l_r + l_f}\tan(\delta_{real})\right), \text{ and} \quad [4]$$

where $l_r$ is the length from the front of the AV to the CoG of the vehicle and $l_f$ is the length from the rear of the vehicle to the CoG of the vehicle.

In an embodiment, the cost functions $J_{stage}$ and $J_{terminal}$ are given by:

$$J_{stage} = J_{comfort}(x_k, u_k) + J_{tracking}(x_k) + J_{slack}(s_k) \forall k \in \{0, \ldots, N-1\}, \quad [5]$$

and $$J_{terminal} = J_{tracking}(x_N) + J_{slack}(S_N). \quad [6]$$

In an embodiment, tracking performance is only required for the first three states, the comfort requirement is applicable to acceleration and both inputs. Both the tracking and comfort objectives are implemented as a quadratic cost. Slack violation is penalized by either a quadratic or a linear cost:

$$J_{tracking} = (x - x_{ref})^T Q(x - x_{ref}),\qquad [7]$$

$$J_{comfort} = [a_{lon}\ a_{lat}\ u^T]R\begin{bmatrix}a_{lon}\\a_{lat}\\u\end{bmatrix},\qquad [8]$$

$$J_{slack} = s^T E s_{soft} + \overline{H} s_{hard},\qquad [9]$$

where Q=diag($q_s$, $q_n$, $q_\mu$, 0, 0, 0, 0), R=diag($r_{alon}$, $r_{alat}$, $r_{jerk}$, $r_\delta$), H=[$e_{s_n}$, $e_{s_a}$, $e_{s_s}$] and E=diag($s_{nsoft}$, $s_{vsoft}$, $s_{asoft}$), represent the individual weight factors of each cost term.

Note that the formulation of Equations [2]-[9] differs from conventional MPC because MPC uses a dynamic lookahead to approximate the biasing decision and sample the spatial constraints with the predicted time from nominal MPC model 806. By contrast, the above MPC-like formulation in Equation [2], re-encodes the spatial and velocity constraints in a maneuver description (a homotopy), and hence no additional decisions or approximations have to be made by vehicle controller 808.

In an embodiment, a rulebook defines high-level constraints that provide behavioral expectations of a vehicle. A course motion plan is received from the route planner 802 as describe above, to which a more refined realization is generated that considers the motion model and cost function described above. One or more rules in the rulebook are considered in the MPC-like optimization described above. The one or more rules specify the solution space for the trajectory optimization, defined by the course motion plan. In some embodiments, one or more rules can be re-evaluated within the nominal MPC formulation, such a proximity rule. Table I below is an example of adopted rules.

TABLE I

Example Rulebook Constraints

| Rule Implemented By Planning Module | MPC Implementation Detail |
|---|---|
| Safety (collision avoidance) | Proximity rule as a non-linear inequality constraint on both velocity and lateral position |
| Stay in lane | Non-linear constraint on deviation from the path with correction for the vehicle footprint w.r.t. the true lane boundaries |
| Max, Min speed limit, stop sign | State constraint on velocity |
| Comfortable accel/decel | State constraint on acceleration |
| No sudden braking | State constraint on jerk |

Linear Inequality Constraints

The above-specified example rulebook constraints are converted into state constraints. The feasible set of states, $x \in X$, inputs $u \in U$, and slack variables, $s \in S$, are expressed by linear inequality constraints. Note that the slack variables are by definition semipositive. The linear inequality constraints are hard and do not allow for slack, and thus cannot control the violation of the constraints. In an embodiment, the vehicle does not operate close to the boundaries of the state constraints:

$$x_{min} \leq x \leq x_{max},$$

$$u_{min} \leq u \leq u_{max},$$

$$0 \leq a \leq a_{max}.$$

Non-Linear Inequality Constraints

Through the use of general inequality constraints, more complex constraints can be imposed. These more complex constraints can be non-linear combinations of different states, inputs and online-specifiable variables. Generally, constraints are used on lateral position and speed to generate a tube around the anchor path given by the route planner 802. Slack variables are used in these constraint formulations to explicitly control and penalty violations. In an embodiment, the following non-linear inequality constraints are defined:

$$c^{station}(x,\lambda_s) \leq 0,$$

$$c^{vel}(x,\lambda_{vsoft}) \leq 0$$

$$c^{tube\_hard}(x,\lambda_n) \leq 0,$$

$$c^{tube\_soft}(x,\lambda_{nsoft}) \leq 0,$$

$$c^{a\_hard}(x,\lambda_a) \leq 0,$$

$$c^{a\_soft}(x,\lambda_{asoft}) \leq 0,$$

$$c^{vel\_prox}(x,\lambda_v) \leq 0.$$

The above nominal MPC model 806 formulation can be modified for unstructured MPC model 807 by using the detected drivable area as a hard spatial constraint. For example, a non-linear constraint can be imposed on deviation from the real-time drivable area with correction for the vehicle footprint w.r.t. the true drivable area boundaries rather than lane boundaries. Also, a state constraint on maximum speed can be imposed to ensure that the vehicle operates below a maximum speed when driving within the real-time drivable area. The cost function in Equation [7] can include only a tracking cost term and the states in Equation [2] can be reduced to the first three states, including changes in progress, lateral error and local heading.

Accordingly, system 800 provides an advantage over existing vehicle control systems by allowing the vehicle to continue navigating, albeit at a slower speed, a real-time drivable area detected by sensors, instead of requesting an intervention, such as remote vehicle assistance (RVA), or performing a safe stop maneuver, for example.

Figure 9:
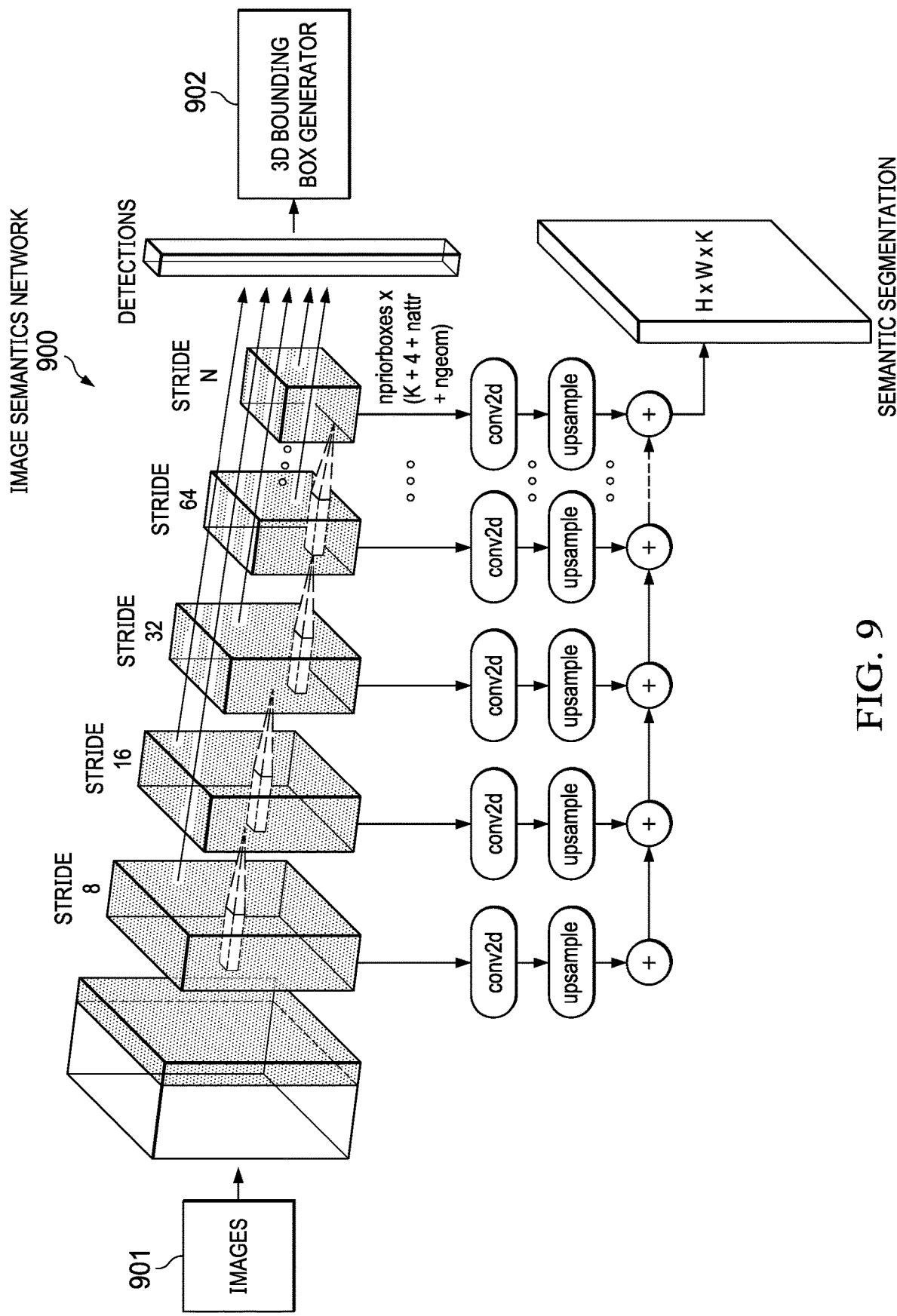
FIG. 9 is a block diagram of an image semantics network (ISN), in accordance with one or more embodiments.

FIG. 9 is a block diagram of an ISN 900 described in reference to FIGS. 7 and 8, in accordance with one or more embodiments. The example ISN 900 shown is a single stage, single image object detection network that is based on single shot detection (SSD). The ISN 900 takes input image 901, predicts the class of each pixel in the image 901 and outputs semantic segmentation data (e.g., class labels and classification scores) for each pixel in the image 901. In an embodiment, ISN 900 is trained using an image dataset that includes images where each image is annotated with 2D bounding boxes and segmentation labels for classes in the image dataset. An example classification score is a probability value that indicates the probability that the class of the pixel was correctly predicted. In an embodiment, ISN

900 includes a backbone and detection head. In an embodiment, the backbone is a fully convolutional neural network (FCNN) and the detection head is an SSD, as described in W. Liu, D. Anguelov, D. Erhan, C. Szegedy, S. Reed, C.-Y. Fu, and A. C. Berg. SSD: Single shot multibox detector. In *ECCV,* 2016. Various loss functions can be employed by ISN 900 including but not limited to: classification loss, localization loss and attribute loss.

In an embodiment, ISN 900 includes two sub-networks: a top-down network that produces features at increasingly small spatial resolution and a second network that performs upsampling and concatenation of the top-down features. The top-down network can be characterized by a series of blocks. Each block operates at stride S (measured relative to the original input image 901). A block has L 3×3 2D convolutional layers with F output channels, each followed by BatchNorm and a ReLU. The first convolution inside the layer has stride $$\frac{S}{S_{in}}$$

to ensure the block operates on stride S after receiving an input blob of stride $S_{in}$. All subsequent convolutions in a block have stride 1.

The final features from each top-down block are combined through upsampling and concatenation as follows. First, the features are upsampled from an initial stride $S_{in}$ to a final stride $S_{out}$ (both again measured wrt. original image 901) using a transposed 2D convolution with F final features. Next, BatchNorm and ReLU is applied to the upsampled features. The final output features are a concatenation of all features that originated from different strides.

In an embodiment, the SSD outputs are augmented to provide encoded 3D properties of the object along with a 2D bounding box and classification scores. The encoded 3D properties include information about the dimension, orientation and location of a 3D bounding box for the object in a format that can be decoded, along with its priorbox and camera intrinsic parameters, into a 3D bounding box in a global coordinate system. For each priorbox, the dimensions and location of the priorbox, the encoded 3D properties and the camera intrinsic parameters are input into 3D bounding box generator 902 which generates a 3D bounding box for the object.

The example ISN 900 is only one example of an image semantics network that can be used with the disclosed embodiments. Any network or set of networks that operate on a single image to estimate segmentation, image classification and 2D and 3D detection, can be used with the disclosed embodiments.

Figure 10:
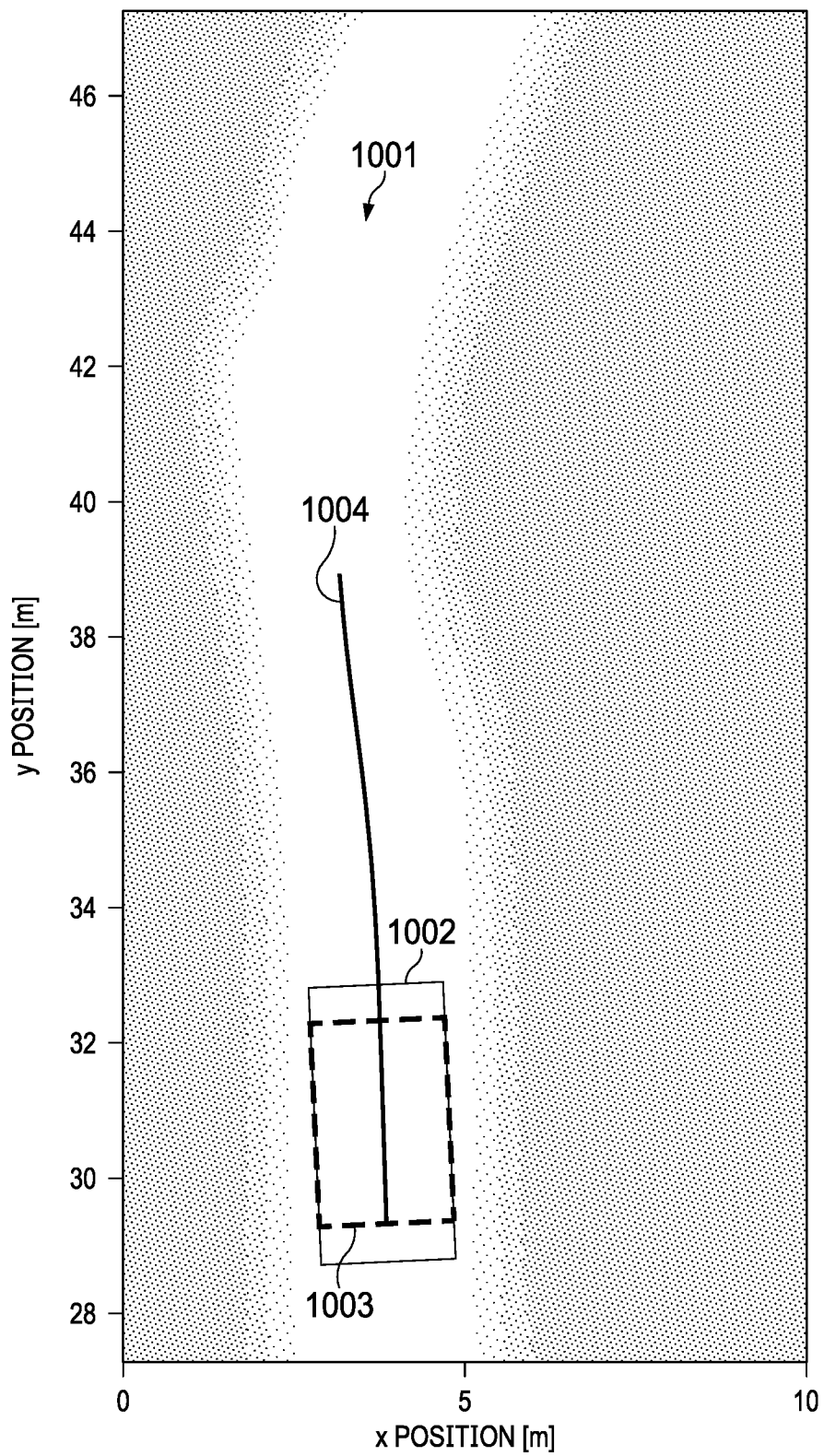
FIG. 10 illustrates a single execution trajectory in a simulation run, in accordance with one or more embodiments.

FIG. 10 illustrates a single execution trajectory 1004 in a simulation run, in accordance with one or more embodiments. The vertical axis is y position (m) and the horizontal axis is x position (m). Real-time drivable area 1001 is the white area. Non-drivable area is the black area. Bounding box 1002 represents the vehicle footprint and bounding box 1003 represents the front and rear axles of the vehicle. The simulation uses the kinematic bicycle model and cost functions described above in reference to FIG. 8, and the real-time drivable area 1001 as a spatial constraint.

Example Processes

Figure 11:
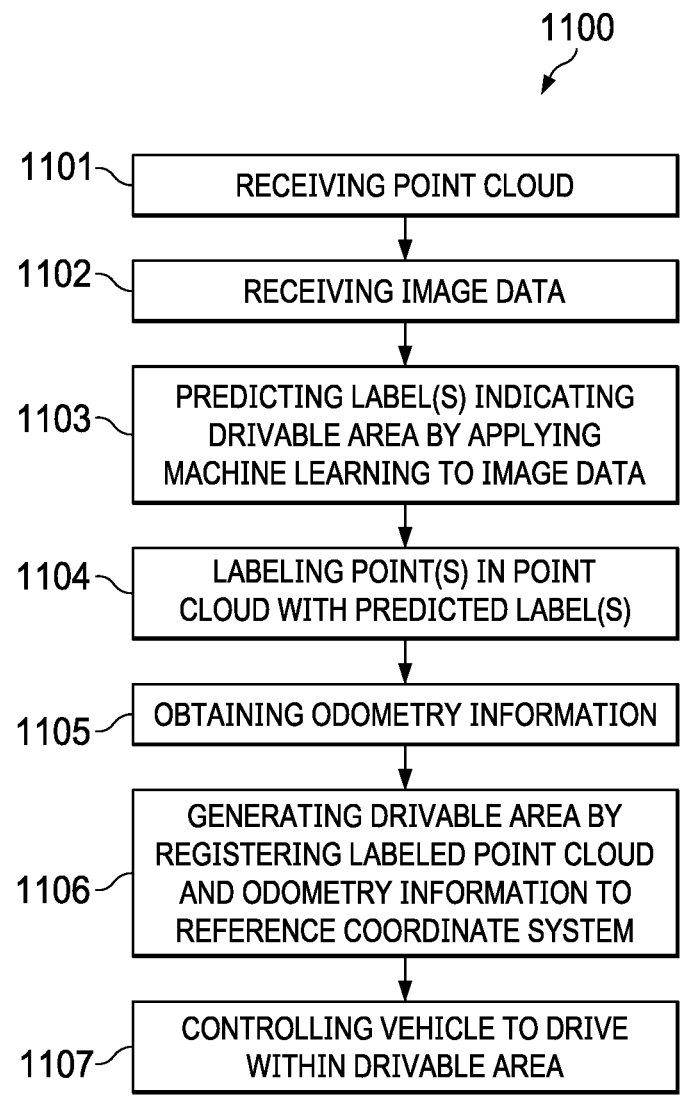
FIG. 11 is a flow diagram of navigation with drivable area detection, in accordance with one or more embodiments.

FIG. 11 is a flow diagram of a process 1100 of navigation with drivable area detection, in accordance with one or more embodiments. Process 1100 can be implemented using, for example, computer system 300, as described in reference to FIG. 3.

Process 1100 includes the steps of: receiving a point cloud from a depth sensor (1101), receiving image data from a camera (1102); predicting at least one label indicating a drivable area by applying machine learning to the image data (1103); labeling the point cloud using the at least one label (1104); obtaining odometry information (1104); generating a drivable area by registering the labeled point cloud and odometry information to a reference coordinate system (1105); and controlling the vehicle to drive within the drivable area (1106). Each of these steps was described in detail with respect to FIGS. 1-10.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further including," in the foregoing description or following claims, what follows this phrase can be an additional step or entity, or a sub-step/sub-entity of a previously-recited step or entity.

What is claimed is:

1. A method comprising:
generating, with at least one processor, a real-time drivable area responsive to a subsystem failure of a vehicle by merging a labeled point cloud and an odometry position in a reference coordinate system, wherein the labeled point cloud is generated using a label of a corresponding pixel of image data;
generating, with the at least one processor, a map-independent, alternative trajectory from an unstructured predictive control model within the real-time drivable area; and
controlling, with the at least one processor, the vehicle according to the map-independent, alternative trajectory from the unstructured predictive control model.

2. The method of claim 1, further comprising:
obtaining a maximum speed based on a free space of the real-time drivable area; and
controlling the vehicle to drive below the maximum speed according to the map-independent, alternative trajectory.

3. The method of claim 1, further comprising:
generating the labeled point cloud by projecting points in a point cloud onto the image data using pinhole projection.

4. The method of claim 1, further comprising:
calculating a vehicle footprint with respect to the real-time drivable area; and
detecting a deviation from the real-time drivable area based on the calculated vehicle footprint.

5. The method of claim 1, wherein the odometry position is obtained from motion data provided by at least one inertial sensor and wheel speed provided by a wheel speed sensor.

6. The method of claim 1, wherein the map-independent, alternative trajectory is generated by minimizing a cost function of tracking and comfort constraints.

7. The method of claim 1, wherein the odometry position includes a position and a heading of the vehicle.

8. A system, comprising:
   at least one sensor;
   at least one computer-readable medium storing computer-executable instructions;
   at least one processor configured to communicate with the at least one sensor and to execute the computer-executable instructions, the execution carrying out operations including:
   generating, with the at least one processor, a real-time drivable area responsive to a subsystem failure of a vehicle by merging a labeled point cloud and an odometry position in a reference coordinate system, wherein the labeled point cloud is generated using a label of a corresponding pixel of image data;
   generating, with the at least one processor, a map-independent, alternative trajectory from an unstructured predictive control model within the real-time drivable area; and
   controlling, with the at least one processor, the vehicle according to the map-independent, alternative trajectory from the unstructured predictive control model.

9. The system of claim 8, the operations further comprising:
   obtaining a maximum speed based on a free space of the real-time drivable area; and
   controlling the vehicle to drive below the maximum speed according to the map-independent, alternative trajectory.

10. The system of claim 8, the operations further comprising:
    generating the labeled point cloud by projecting points in a point cloud onto the image data using pinhole projection.

11. The system of claim 8, the operations further comprising:
    calculating a vehicle footprint with respect to the real-time drivable area; and
    detecting a deviation from the real-time drivable area based on the calculated vehicle footprint.

12. The system of claim 8, wherein the odometry position is obtained from motion data provided by at least one inertial sensor and wheel speed provided by a wheel speed sensor.

13. The system of claim 8, wherein the map-independent, alternative trajectory is generated by minimizing a cost function of tracking and comfort constraints.

14. The system of claim 8, wherein the odometry position includes a position and a heading of the vehicle.

15. A non-transitory computer-readable storage medium comprising at least one program for execution by at least one processor of a device, the at least one program including instructions which, when executed by the at least one processor, cause the device to perform operations comprising:
    generating, with the at least one processor, a real-time drivable area responsive to a subsystem failure of a vehicle by merging a labeled point cloud and an odometry position in a reference coordinate system, wherein the labeled point cloud is generated using a label of a corresponding pixel of image data;
    generating, with the at least one processor, a map-independent, alternative trajectory from an unstructured predictive control model within the real-time drivable area; and
    controlling, with the at least one processor, the vehicle according to the map-independent, alternative trajectory from the unstructured predictive control model.

16. The non-transitory computer-readable storage medium of claim 15, the operations further comprising:
    obtaining a maximum speed based on a free space of the real-time drivable area; and
    controlling the vehicle to drive below the maximum speed according to the map-independent, alternative trajectory.

17. The non-transitory computer-readable storage medium of claim 15, the operations further comprising:
    generating the labeled point cloud by projecting points in a point cloud onto the image data using pinhole projection.

18. The non-transitory computer-readable storage medium of claim 15, the operations further comprising:
    calculating a vehicle footprint with respect to the real-time drivable area; and
    detecting a deviation from the real-time drivable area based on the calculated vehicle footprint.

19. The non-transitory computer-readable storage medium of claim 15, wherein the odometry position is obtained from motion data provided by at least one inertial sensor and wheel speed provided by a wheel speed sensor.

20. The non-transitory computer-readable storage medium of claim 15, wherein the map-independent, alternative trajectory is generated by minimizing a cost function of tracking and comfort constraints.

* * * * *